(12) United States Patent
Yoshimura et al.

(10) Patent No.: US 8,895,140 B2
(45) Date of Patent: Nov. 25, 2014

(54) VINYLIDENE FLUORIDE RESIN FILM

(75) Inventors: Hidetoshi Yoshimura, Kamakura (JP); Fukumu Komoda, Isesaki (JP); Atsushi Igarashi, Kamakura (JP); Susumu Ooka, Isesaki (JP); Koji Nakajima, Isesaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 120 days.

(21) Appl. No.: 13/201,246

(22) PCT Filed: Feb. 9, 2010

(86) PCT No.: PCT/JP2010/051856
§ 371 (c)(1),
(2), (4) Date: Aug. 12, 2011

(87) PCT Pub. No.: WO2010/092942
PCT Pub. Date: Aug. 19, 2010

(65) Prior Publication Data
US 2011/0293945 A1  Dec. 1, 2011

(30) Foreign Application Priority Data

Feb. 13, 2009  (JP) .................................. 2009-030748
Feb. 13, 2009  (JP) .................................. 2009-030749

(51) Int. Cl.
| | | |
|---|---|---|
| B32B 27/20 | (2006.01) | |
| C08K 3/22 | (2006.01) | |
| C08K 5/053 | (2006.01) | |
| C08L 27/16 | (2006.01) | |
| C08L 33/10 | (2006.01) | |
| C08L 71/02 | (2006.01) | |
| C08G 65/332 | (2006.01) | |
| C09J 171/02 | (2006.01) | |
| C08L 33/12 | (2006.01) | |

(52) U.S. Cl.
CPC .................. *C08L 71/02* (2013.01); *B32B 27/20* (2013.01); *C08G 65/3322* (2013.01); *C08K 3/22* (2013.01); *C08K 5/053* (2013.01); *C08L 27/16* (2013.01); *C08L 33/10* (2013.01); *C08L 33/12* (2013.01); *C09J 171/02* (2013.01)

USPC ........... 428/328; 428/220; 428/421; 428/522; 523/216

(58) Field of Classification Search
None
See application file for complete search history.

(56) References Cited

U.S. PATENT DOCUMENTS

| 3,437,502 A | * | 4/1969 | Werner .......................... 106/437 |
| 3,804,655 A | * | 4/1974 | Hinley et al. ................. 106/437 |
| 5,256,472 A | * | 10/1993 | Moriya et al. ................ 428/215 |

FOREIGN PATENT DOCUMENTS

| JP | 61-275344 | 12/1986 |
| JP | 01-275042 | 11/1989 |
| JP | 02-235953 | 9/1990 |
| JP | 08-267675 | 10/1996 |
| JP | 2006-018255 | 1/2006 |
| JP | 2008-012689 | 1/2008 |
| WO | 2007/085769 | 8/2007 |

* cited by examiner

*Primary Examiner* — Ramsey Zacharia
(74) *Attorney, Agent, or Firm* — Roberts Mlotkowski Safran & Cole P.C.

(57) ABSTRACT

Provided is a vinylidene fluoride resin film that has good adhesiveness to a base material, achieves good dispersivity even when a pigment is contained in large amounts, and has excellent thermal stability during a forming process. To a resin component composed of a vinylidene fluoride resin and a methacrylic acid ester resin, a predetermined amount of a titanium oxide surface treated with alumina and silica and a predetermined amount of a fatty acid ester of polyethylene glycol and/or its derivative are added to prepare a vinylidene fluoride resin film. Alternatively, at least a front side layer and a back side layer have such a composition, the front side layer has a combination amount of the vinylidene fluoride resin and the methacrylic acid ester resin of 70:30 to 95:5 in terms of mass ratio, and the back side layer has a combination amount of the vinylidene fluoride resin and the methacrylic acid ester resin of 5:95 to 45:55 in terms of mass ratio. In each case, the total adhesion amount of alumina and silica is 5 to 11% by mass in the titanium oxide relative to the total mass of the titanium oxide.

14 Claims, No Drawings

VINYLIDENE FLUORIDE RESIN FILM

TECHNICAL FIELD

The present invention relates to vinylidene fluoride resin films. More specifically, it relates to vinylidene fluoride resin films including a vinylidene fluoride resin combined with a methacrylic acid ester resin, an inorganic pigment, and the like.

BACKGROUND ART

Surfaces of plastic plates, metal plates, and other various base materials that are used for interior and exterior members of buildings are coated or laminated with a resin film in order, for example, to protect the base materials, to improve weatherability, and to add decorativeness and design quality. A resin film used for such applications is mainly a fluorine resin film having excellent weatherability, and especially, a vinylidene fluoride resin film is used in many cases.

The vinylidene fluoride resin film is used not only in the applications above but also in various applications such as wallpapers and wall materials, interior and exterior materials for vehicles, elevators, and the like, roof materials such as roof tiles, rain gutters, garages, arcades, sunrooms, agricultural materials, canvas for tents, advertising displays, signs, labels, marking films, furniture, home electric appliances, trays, solar cells, and window glass.

The fluorine resin has a problem of poor adhesiveness to other materials. Hence, there has been developed a vinylidene fluoride resin film that obtains improved adhesiveness to a base material by having a multi-layered structure (for example, see Patent Documents 1 and 2). In the films described in Patent Documents 1 and 2, each of a surface layer and an adhesion layer is formed from a vinylidene fluoride resin and/or a methacrylic acid ester resin. The combination ratio of the vinylidene fluoride resin and the methacrylic acid ester resin is differentiated between the surface layer and the adhesion layer to thereby improve the adhesiveness to a base material.

Furthermore, in the film described in Patent Document 1, an inorganic pigment such as titanium oxide and talc is added into at least one layer for imparting light blocking properties to the film and for improving the weatherability. Moreover, conventionally, there has been disclosed an optical film that includes an ultraviolet absorbing layer having a fluorine resin such as a vinylidene fluoride resin and particles of an inorganic compounds such as zinc oxide, titanium dioxide, and alumina (see Patent Document 3).

There has also been disclosed a fluorine resin colored composition in which a fatty acid ester of polyethylene glycol and/or its derivative is added to a resin component composed of a vinylidene fluoride resin and a methacrylic acid ester resin for improving dispersivity of an inorganic pigment (see Patent Document 4).

CITATION LIST

Patent Document

[Patent Document 1] Japanese Unexamined Patent Application Publication No. 8-267675
[Patent Document 2] Japanese Unexamined Patent Application Publication No. 2008-12689
[Patent Document 3] Japanese Unexamined Patent Application Publication No. 2006-18255
[Patent Document 4] Japanese Unexamined Patent Application Publication No. 2-235953

SUMMARY OF INVENTION

Technical Problems

However, the fluorine resin is one of the resins having the smallest surface tension and has an extremely low surface wettability with respect to various substances. Thus, the conventional fluorine resin film has a problem of readily causing a defective in a film production process. In particular, a film including a fluorine resin combined with an inorganic pigment, such as the films described in Patent Documents 1, 3, and 4, has a problem of readily causing poor dispersion of the pigment. The inorganic pigment having poor dispersivity readily generates pinholes during the forming process of a film and the like and also reduces thermal stability during forming processes such as a compound process and a film forming process.

Meanwhile, in the resin composition described in Patent Document 4, a fatty acid ester of polyethylene glycol and/or its derivative is added in order to improve the dispersivity of the inorganic pigment. However, the addition of a large amount of such dispersant reduces the weatherability and physical strength of the resin film. On this account, while the addition of a dispersant such as the fatty acid ester of polyethylene glycol is effective for a resin film having a low content of the inorganic pigment, it cannot achieve an effect sufficient for suppressing the poor dispersion of a pigment for a resin film having a high content of the inorganic pigment because the film cannot contain the dispersant in an amount sufficient for the pigment.

Therefore, the present invention has a main object to provide a vinylidene fluoride resin film that has good adhesiveness to a base material, achieves good dispersivity even when a pigment is contained in large amounts, and has excellent thermal stability during a forming process.

Solution to Problem

A vinylidene fluoride resin film of the present invention includes a vinylidene fluoride resin, a methacrylic acid ester resin, a titanium oxide surface treated with alumina and silica, and a fatty acid ester of polyethylene glycol and/or a derivative thereof. The titanium oxide has a total adhesion amount of alumina and silica of 5 to 11% by mass.

The adhesion amount of alumina and silica to the surface of titanium oxide defined here is the value measured by X-ray fluorescence (XRF) method, and the same applies to the following inventions.

In the invention, the titanium oxide having the surface to which particular amounts of the alumina and the silica adhere is included as an inorganic pigment, and therefore such a resin film can achieve good dispersivity even when a large amount of the inorganic pigment is included. Furthermore, the resin film has good adhesiveness to a base material because the methacrylic acid ester resin is included in addition to the vinylidene fluoride resin.

In the resin film, a content of the titanium oxide may be 10 to 25 parts by mass, and a total content of the fatty acid ester of polyethylene glycol and/or the derivative thereof may be 0.1 to 5 parts by mass, relative to 100 parts by mass of a resin component composed of 70 to 95% by mass of the vinylidene fluoride resin and 5 to 30% by mass of the methacrylic acid ester resin.

Another vinylidene fluoride resin film of the present invention is a multilayer film including two or more layers having compositions different from each other. At least a front side layer and a back side layer include a vinylidene fluoride resin, a methacrylic acid ester resin, a titanium oxide surface treated with alumina and silica, and a fatty acid ester of polyethylene glycol and/or a derivative thereof. The front side layer has a combination ratio of the vinylidene fluoride resin and the methacrylic acid ester resin of 70:30 to 95:5 in terms of mass ratio, the back side layer has a combination ratio of the vinylidene fluoride resin and the methacrylic acid ester resin of 5:95 to 45:55 in terms of mass ratio, and the titanium oxide has a total adhesion amount of alumina and silica of 5 to 11% by mass.

In the invention, the titanium oxide having a surface to which particular amounts of the alumina and the silica adhere is included as an inorganic pigment, and therefore such a resin film can achieve good dispersivity even when a large amount of the inorganic pigment is included. Furthermore, the front side layer has a high combination ratio of the vinylidene fluoride resin, and the back side layer has a high combination ratio of the methacrylic acid ester resin. Hence, the resin film obtains excellent adhesiveness to a base material in addition to the weatherability and heat resistance properties.

In the resin film, at least one of the front side layer and the back side layer may include the titanium oxide in a content of 10 to 25 parts by mass and the fatty acid ester of polyethylene glycol and/or the derivative thereof in a total content of 0.1 to 5 parts by mass, relative to 100 parts by mass of a resin component composed of the vinylidene fluoride resin and the methacrylic acid ester resin.

In these resin films, it is preferable that the content of the titanium oxide is 12 to 20 parts by mass.

Also, it is preferable that the total adhesion amount of alumina and silica is 6 to 10% by mass in the titanium oxide.

Furthermore, it is preferable that the adhesion amount of alumina is 2.5% by mass or more and the adhesion amount of silica is 2.5% by mass or more in the titanium oxide.

Advantageous Effects of Invention

According to the present invention, a resin film that has good adhesiveness to a base material, is unlikely to cause poor dispersivity of a pigment, and has excellent thermal stability during a forming process can be obtained because the resin film contains the methacrylic acid ester resin in addition to the vinylidene fluoride resin, and contains, as an inorganic pigment, the titanium oxide having a surface to which particular amounts of alumina and silica adhere.

DESCRIPTION OF EMBODIMENTS

Hereinafter, embodiments for carrying out the present invention will be described in detail. The embodiments described below are exemplary embodiments of the present invention, and the scope of the invention is not intended to be limited to the embodiments.

First Embodiment

First, the vinylidene fluoride resin film (hereinafter, also simply referred to as resin film) of a first embodiment of the present invention will be described. The resin film of the embodiment includes at least a resin component composed of a vinylidene fluoride resin and a methacrylic acid ester resin, a titanium oxide, and a fatty acid ester of polyethylene glycol and/or its derivative.

The titanium oxide included in the resin film of the embodiment is surface treated with alumina and silica, and the total adhesion amount of them is 5 to 11% by mass relative to the total mass of the titanium oxide. Here, "total mass of the titanium oxide" is the mass including those of alumina and silica that adhere to the surface. Hereinafter, each component constituting the resin film of the embodiment will be described.

[Vinylidene Fluoride Resin]

The vinylidene fluoride resin has excellent weatherability and heat resistance properties and is a main component in the resin film of the embodiment. The vinylidene fluoride resin included in the resin film of the embodiment may be any vinyl compound as far as it has a vinylidene fluoride monomer unit, and the structure or the like is not specifically limited. It may be a homopolymer of vinylidene fluoride and may be a copolymer of vinylidene fluoride with another vinyl compound monomer.

Examples of the vinyl compound to form the copolymer with vinylidene fluoride include fluorinated vinyl compounds such as vinyl fluoride, tetrafluoroethylene, chlorotrifluoroethylene, and hexafluoropropylene and known vinyl monomers such as styrene, ethylene, butadiene, and propylene.

[Methacrylic Acid Ester Resin]

The methacrylic acid ester resin constitutes the resin component together with the vinylidene fluoride resin and has an improvement effect on the adhesiveness to a base material and the like. Though the vinylidene fluoride resin has poor adhesiveness to other materials, the combination with the methacrylic acid ester resin can lead to the adhesion to a base material or the like even without an expensive adhesive.

The methacrylic acid ester resin included in the resin film of the embodiment may be any vinyl polymer as far as it is derived from a methacrylic acid ester monomer, and the structure or the like is not specifically limited. Examples of the methacrylic acid ester monomer include methyl methacrylate, ethyl methacrylate, propyl methacrylate, butyl methacrylate, pentyl methacrylate, and hexyl methacrylate. Among them, methyl methacrylate is particularly preferred. In the methacrylic acid ester monomer, the alkyl group such as the propyl group, the butyl group, the pentyl group, and the hexyl group may be straight or branched.

The methacrylic acid ester resin included in the resin film of the embodiment may be a homopolymer of a methacrylic acid ester monomer or a copolymer of a plurality of methacrylic acid ester monomers. The methacrylic acid ester resin may include a monomer unit derived from a known vinyl compound other than methacrylic acid esters, such as styrene, ethylene, butadiene, α-methylstyrene, acrylonitrile, acrylic acid, and propylene.

[Resin Component Combination Ratio]

The resin component in the resin film of the embodiment is composed of the vinylidene fluoride resin and the methacrylic acid ester resin, and the combination ratio is desirably vinylidene fluoride resin:methacrylic acid ester resin=70:30 to 95:5 in terms of mass ratio. A small combination amount of the methacrylic acid ester resin and a content of the vinylidene fluoride resin of more than 95% by mass relative to the total mass of the resin components may lead to thermal decomposition of the resin during a forming process to change a resin color into yellow, brown, or the like, and consequently the obtained film may not have an intended color.

Here, "during a forming process" represents a "compound process" in which a plurality of materials are mixed and then melted, heated, and kneaded in an extruder to make pellets and a "film producing process" in which the resin pellets are melted and heated using a film extruder to make a film using dies, and then the film is cooled and rolled up. The same applies to the following description.

In contrast, a large combination amount of the methacrylic acid ester resin and a content of the vinylidene fluoride resin of less than 70% by mass relative to the total mass of the resin components reduces the weatherability, and consequently the color fastness may not be ensured when such a resin film is used outdoors over a long period of 20 years or more.

[Titanium Oxide]

The resin film of the embodiment includes an inorganic pigment in order to absorb or reflect ultraviolet rays and is whereby colored white. Specifically, as the inorganic pigment, a titanium oxide surface treated with alumina and silica is included. The weatherability of the resin film itself can be sufficiently ensured because the vinylidene fluoride resin is excellent in the weatherability. However, for example, when the resin film is used as a protection film, it is required that an object to be protected present under the film is not irradiated with ultraviolet rays. Thus, in the resin film of the embodiment, the titanium oxide absorbs or reflects light to suppress the transmission of ultraviolet rays.

The titanium oxide included in the resin film of the embodiment is preferably a rutile-type or anatase-type crystalline titanium oxide that is obtained by chloride method or sulfate method. For example, for the production of the titanium oxide by the chloride method, $TiCl_4$ is oxidized to make $TiO_2$ particles. For the production of the titanium oxide ($TiO_2$) by the sulfate method, sulfuric acid and a mineral ore containing titanium are dissolved, and the obtained solution is subjected to a series of processes to produce $TiO_2$. Practically, the rutile-type crystalline titanium oxide is desirably used because it is less colored due to reduced weatherability.

The titanium oxide preferably has a particle diameter of 0.05 to 2.0 μm in terms of average particle diameter determined by precipitation method. The titanium oxide having a particle diameter of less than 0.05 μm shows transparency due to the transmission of visible light, and the titanium oxide having a particle diameter of more than 2 μm lowers the dispersivity to a resin to readily cause aggregation.

The "surface treatment" with alumina and silica means that alumina and silica are adsorbed to a surface of titanium oxide or that at least one compound of the reaction product of alumina with titanium oxide and the reaction product of silica with titanium oxide is present as an adsorption species or chemically bonded. On the surface of the titanium oxide surface treated in this manner, alumina and silica are present continuously or discontinuously and as a single or double coating layer. In particular, the titanium oxide surface is preferably coated with silica as the first layer and then coated with alumina as the second layer on the first layer. The method of the surface treatment of titanium oxide with alumina and silica is not necessarily limited and may be a known method.

The total adhesion amount of alumina and silica is 5 to 11% by mass and preferably 6 to 10% by mass relative to the total mass of the titanium oxide. A total adhesion amount of alumina and silica of less than 5% by mass reduces the dispersivity of titanium oxide to the resin component, and consequently both the weatherability and the thermal stability during a forming process cannot be ensured. Specifically, a small adhesion amount of alumina reduces the dispersivity of titanium oxide to the resin component to lower the thermal stability during a forming process. A small adhesion amount of silica reduces the film weatherability. In contrast, a total adhesion amount of alumina and silica of more than 11% by mass causes easy aggregation among titanium oxide particles, and consequently a fine film appearance cannot be obtained.

Each adhesion amount of alumina and silica is more preferably 2.5% by mass or more in the total mass of the titanium oxide. An alumina adhesion amount of 2.5% by mass or more can improve the dispersivity of the titanium oxide to the resin component. A silica adhesion amount of 2.5% by mass or more improves the weatherability of the resin film. In addition, as described above, a total adhesion amount of these compounds of 5.0% by mass or more can achieve good thermal stability during the forming processes such as a compound process and a film producing process.

The adhesion amount of alumina and silica in the total mass of the titanium oxide can be calculated on the basis of the test result that is obtained by the quantitative determination of elements adhered to the titanium oxide surface by X-ray fluorescence (XRF) method. Specifically, the content of each element of titanium (Ti), aluminum (Al), and silicon (Si) is quantitatively determined in the total mass of the titanium oxide by the X-ray fluorescence (XRF) method, and the mass of each oxide ($TiO_2$, $Al_2O_3$, and $SiO_2$) (conversion value) is calculated from the content. Furthermore, when a compound containing these elements other than the oxides is present on the titanium oxide surface, the presence ratio of an element present on the surface is determined by X-ray photoelectron spectroscopy (XPS), and consequently each of the oxides and other compounds can be quantitatively determined.

In the resin film of the embodiment, the combination amount of the titanium oxide is preferably 10 to 25 parts by mass and more preferably 12 to 20 parts by mass, relative to 100 parts by mass of the resin component above. Relative to 100 parts by mass of the resin component, an amount of the titanium oxide of less than 10 parts by mass may cause insufficient absorption or reflection of ultraviolet rays to reduce the weatherability in the case of a thin film, for example, having a thickness of 30 μm or less. In contrast, an amount of the titanium oxide of more than 25 parts by mass leads to difficulty of uniform dispersion of the titanium oxide to the resin component, and a thin film, for example, having a thickness of 30 μm or less may have a poor surface appearance.

The resin film of the embodiment may further include, in addition to the titanium oxide, inorganic pigments such as zinc oxide, zinc sulfide, and barium sulfate. In such a case, the total content of inorganic pigments including the titanium oxide is desirably 10 to 30 parts by mass relative to 100 parts by mass of the resin component.

[Fatty Acid Ester of Polyethylene Glycol and its Derivative]

The fluorine resin is one of the resins having the smallest surface tension and has an extremely low surface wettability with respect to various substances. Thus, the presence of a large amount of a pigment in order to color the film readily leads to poor dispersion to cause defects such as pinholes during the forming processes of a film and the like. On this account, the resin film of the embodiment includes a fatty acid ester of polyethylene glycol and/or its derivative that has excellent compatibility with the fluorine resin in order to improve the dispersivity of the pigment (titanium oxide).

Examples of the fatty acid ester of polyethylene glycol and its derivative include fatty acid monoesters of polyethylene glycol, such as polyethylene glycol monolaurate and polyethylene glycol behenate; fatty acid diesters of polyethylene glycol, such as polyethylene glycol dilaurate and polyethylene glycol distearate; and polyethylene glycol monoether fatty acid esters of a higher fatty acid alcohol or an alkylphenol, such as polyethylene glycol monoethylphenol ether laurate and polyethylene glycol monopolyoxyethylene bisphenol A laurate.

The added amount of the fatty acid ester of polyethylene glycol or its derivative can be properly selected depending on the combination amount of the inorganic pigment, but is preferably 0.1 to 5 parts by mass relative to 100 parts by mass of the resin component. A total content of the fatty acid ester of polyethylene glycol and its derivative of less than 0.1 part by mass relative to 100 parts by mass of the resin component may reduce the dispersivity of the inorganic pigment. In contrast, a total content of such compounds of more than 5 parts by mass relative to 100 parts by mass of the resin component may reduce the physical strength of a film or may lead to aggregation of the inorganic pigment to cause poor dispersion.

The thickness of the resin film of the embodiment is not particularly limited and can be properly selected depending on applications and the like. For example, for a protection film, the thickness is preferably 10 to 100 μm.

The resin film of the embodiment may further include, in addition to the components above, an antioxidant, a dispersant, a coupling agent, a heat stabilizer, a surfactant, an antistatic agent, an anti-fogging agent, an ultraviolet absorber, and the like.

Next, a method for producing the vinylidene fluoride resin film of the embodiment will be described. For the production of the vinylidene fluoride resin film of the embodiment, firstly, a resin component composed of the vinylidene fluoride resin and the methacrylic acid ester resin is mixed with a predetermined amount of the titanium oxide that is surface treated with alumina and silica and a predetermined amount of the fatty acid ester of polyethylene glycol and/or its derivative, and the whole is kneaded.

The kneading method may employ a melt-compounding method using a single screw extruder or the like. However, in order to improve the dispersivity of the inorganic pigment, a high shear kneader that rotates at high speed is preferably used. Examples of such a kneader include FCM kneader manufactured by Kobe Steel, Ltd. This achieves good dispersivity of the inorganic pigment to give a film material (resin composition) having an excellent surface condition.

Furthermore, some or all of the vinylidene fluoride resin and/or the methacrylic acid ester resin used for kneading may be powdered, kneading may be performed by using a highly kneading twin screw extruder, and materials premixed at high temperature using a high speed rotating mixer may be melted and kneaded with a single screw extruder. Such treatments can further improve the dispersivity of the inorganic pigment.

Next, the obtained film material (resin composition) is melt-extruded to form a film. The resin film of the embodiment may be a single-layer film or a multilayer film, and melt extrusion molding for the film may employ a coextrusion method, for example, for a film having a multi-layered structure. The coextrusion method using T-dies by which a melted resin is bonded to make multilayers using a plurality of extruders includes a multi manifold die method by which a plurality of resin layers are formed into sheets and then each layer is brought into contact with each other for adhesion, and a feed block method by which a plurality of resins are joined and bonded using a confluent device and then formed into a sheet. Each method may be used for the method for producing the resin film of the embodiment.

In this manner, the vinylidene fluoride resin film of the embodiment uses, as an inorganic pigment, the titanium oxide having a surface to which particular amounts of alumina and silica adhere, and hence the dispersivity to the fluorine resin, specifically to a vinylidene fluoride resin is improved. On this account, the vinylidene fluoride resin of the embodiment is unlikely to cause poor dispersion, and even when the resin includes a larger combination amount of the inorganic pigment (titanium oxide) than in a conventional resin, it does not cause pinholes nor reduce the thermal stability during a forming process. As a result, a large amount of the titanium oxide can be contained to significantly improve the shielding properties against ultraviolet rays and the like.

Second Embodiment

Next, the vinylidene fluoride resin film of a second embodiment of the present invention will be described. The resin film of the embodiment is a multilayer film including two or more layers having compositions different from each other. At least a front side layer and a back side layer include a vinylidene fluoride resin, a methacrylic acid ester resin, a titanium oxide surface treated with alumina and silica, and a fatty acid ester of polyethylene glycol and/or its derivative.
[Resin Component Combination Ratio]

The resin component in the resin film of the embodiment is composed of the vinylidene fluoride resin and the methacrylic acid ester resin. The combination ratio in the front side layer is vinylidene fluoride resin:methacrylic acid ester resin=70:30 to 95:5 in terms of mass ratio, and that in the back side layer is vinylidene fluoride resin:methacrylic acid ester resin=5:95 to 45:55 in terms of mass ratio. Namely, in the resin film of the embodiment, the combination ratio of the vinylidene fluoride resin and the methacrylic acid ester resin in the front side layer is different from that in the back side layer.

For applications represented by exterior parts and exteriors of buildings, the front side layer is required to maintain excellent weatherability, stain resistance, and chemical resistance even when it is exposed to sunlight, rainfall containing chemical substances such as acid rain, and the like. However, a large combination amount of the methacrylic acid ester resin and a content of the vinylidene fluoride resin of less than 70% by mass relative to the total mass of the resin components reduce the weatherability, and consequently, the color fastness may not be ensured when such a resin film is used outdoors over a long period of 20 years or more.

Furthermore, a small combination amount of the methacrylic acid ester resin and an amount of the vinylidene fluoride resin of more than 95% by mass relative to the total mass of the resin components may cause thermal decomposition of the resin during a forming process to change the resin color into yellow, brown, or the like, and consequently the obtained film may not have an intended color. Here, "during a forming process" represents a "compound process" in which a plurality of materials are mixed and then melted, heated, and kneaded in an extruder to make pellets and a "film producing process" in which the resin pellets are melted and heated using a film extruder to make a film using dies, and then the film is cooled and rolled up. The same applies to the following description.

Meanwhile, the resin film of the embodiment is laminated on various base materials by lamination to protect the surface. Thus, its back side layer is required to have excellent adhesiveness to a base material in order not to cause problems such as exfoliation, floating, and swelling when it is bonded to the base material. However, a large combination amount of the vinylidene fluoride resin and an amount of the methacrylic acid ester resin of less than 55% by mass relative to the total mass of the resin components reduce the adhesiveness to a base material. This readily causes exfoliation, floating, swelling, and the like when the resin film is bonded to a base material by thermal lamination, and also such a resin film is hard to be bonded to a base material with a commercially available adhesive such as an acrylic adhesive and an urethane adhesive. Furthermore, a small combination amount of the vinylidene fluoride resin and an amount of the methacrylic acid ester resin of more than 95% by mass relative to the total mass of the resin components reduce the adhesiveness between the front side layer and the back side layer to readily cause delamination.

[Titanium Oxide]

In the resin film of the embodiment, at least the front side layer and the back side layer include an inorganic pigment in order to absorb or reflect ultraviolet rays and whereby the film is colored white. Specifically, as the inorganic pigment, a titanium oxide surface treated with alumina and silica is included. The titanium oxide included in the resin film of the embodiment is surface treated with alumina and silica, and the total adhesion amount of them is 5 to 11% by mass relative to the total mass of the titanium oxide. Here, "total mass of the titanium oxide" is the mass including those of alumina and silica that adhere to the surface.

A total adhesion amount of alumina and silica of less than 5% by mass reduces the dispersivity of titanium oxide to the resin component, and consequently both the weatherability and the thermal stability during a forming process cannot be ensured. Specifically, a small adhesion amount of alumina reduces the dispersivity of titanium oxide to the resin component to lower the thermal stability during a forming process. A small adhesion amount of silica reduces the film weatherability. In contrast, a total adhesion amount of alumina and silica of more than 11% by mass causes easy aggregation among titanium oxide particles, and consequently a fine film appearance cannot be obtained.

Thus, in the resin film of the embodiment, at least the front side layer and the back side layer include the titanium oxide having a total adhesion amount of alumina and silica of 5 to 11% by mass relative to the total mass of the titanium oxide. The adhesion amount of alumina and silica in the titanium oxide is preferably 6 to 10% by mass relative to the total mass of the titanium oxide, and this can improve the dispersivity to the resin component.

Each adhesion amount of alumina and silica is more preferably 2.5% by mass or more in the total mass of the titanium oxide. An alumina adhesion amount of 2.5% by mass or more can improve the dispersivity of the titanium oxide to the resin component. A silica adhesion amount of 2.5% by mass or more improves the weatherability of the resin film. In addition, as described above, a total adhesion amount of these compounds of 5.0% by mass or more can achieve good thermal stability during the forming processes such as a compound process and a film producing process.

In the resin film of the embodiment, at least one of the front side layer and the back side layer or preferably both the front side layer and the back side layer desirably include 10 to 25 parts by mass of the titanium oxide relative to 100 parts by mass of the resin component above. An amount of the titanium oxide of less than 10 parts by mass relative to 100 parts by mass of the resin component may cause insufficient absorption or reflection of ultraviolet rays to reduce the weatherability. In contrast, an amount of the titanium oxide of more than 25 parts by mass may lead to difficulty of uniform dispersion of the titanium oxide to the resin component to cause a poor surface appearance.

The content of the titanium oxide is more preferably 12 to 20 parts by mass relative to 100 parts by mass of the resin component, and this can improve the shielding properties against ultraviolet rays and the like.

Each layer constituting the resin film of the embodiment may further include, in addition to the titanium oxide, inorganic pigments such as zinc oxide, zinc sulfide, and barium sulfate. In such a case, the total content of inorganic pigments including the titanium oxide is desirably 10 to 30 parts by mass relative to 100 parts by mass of the resin component.

The thickness of the resin film of the embodiment is not particularly limited and can be properly selected depending on applications and the like. For example, for a protection film, the thickness is preferably 20 to 100 μm. This can suppress the fabrication cost increase while ensuring the advantages above.

At this time, the thickness ratio of each layer is not particularly limited, but for example, for a resin film composed of two layers of the front side layer and the back side layer, the front side layer preferably has a thickness of 10 μm or more. This can sufficiently achieve fastness such as weatherability, stain resistance, and chemical resistance.

The resin film of the embodiment may further include an inner layer between the front side layer and the back side layer. Each layer constituting the resin film of the embodiment may further include, in addition to the components above, an antioxidant, a dispersant, a coupling agent, a heat stabilizer, a surfactant, an antistatic agent, an anti-fogging agent, an ultraviolet absorber, and the like.

Next, a method for producing the vinylidene fluoride resin film of the embodiment will be described. For the production of the resin film of the embodiment, firstly, a resin composition is prepared for each layer. For example, for the front side layer and the back side layer, a resin component composed of the vinylidene fluoride resin and the methacrylic acid ester resin is mixed with a predetermined amount of the titanium oxide that is surface treated with alumina and silica and a predetermined amount of the fatty acid ester of polyethylene glycol and/or its derivative, and the whole is kneaded.

Next, the obtained film material (resin composition) is melt-extruded to form a film. For the melt extrusion molding, for example, a coextrusion method can be employed. The coextrusion method using T-dies by which a melted resin is bonded to make multilayers using a plurality of extruders includes a multi manifold die method by which a plurality of resin layers are formed into sheets and then each layer is brought into contact with each other for adhesion, and a feed block method by which a plurality of resins are joined and bonded using a confluent device and then formed into a sheet. Each method may be used for the method for producing the resin film of the embodiment.

In this manner, the vinylidene fluoride resin film of the embodiment uses, as an inorganic pigment, the titanium oxide having a surface to which particular amounts of alumina and silica adhere, and hence the dispersivity to the fluorine resin, specifically to a vinylidene fluoride resin is improved. On this account, the vinylidene fluoride resin of the embodiment is unlikely to cause poor dispersion, and even when the resin includes a larger combination amount of the inorganic pigment (titanium oxide) than in a conventional resin, it does not cause pinholes nor reduce the thermal stability during a forming process. As a result, a large amount of the titanium oxide can be contained to significantly improve the shielding properties against ultraviolet rays and the like.

Furthermore, in the vinylidene fluoride resin film of the embodiment, the front side layer has a high combination ratio of the vinylidene fluoride resin, and the back side layer has a high combination ratio of the methacrylic acid ester resin. Hence, the adhesiveness to a base material can be improved without reducing the weatherability and heat resistance.

The structure and the advantages other than the above in the vinylidene fluoride resin film of the embodiment are the same as in the first embodiment.

EXAMPLES

First Example

Hereinafter, the advantages of the invention will be described with reference to examples and comparative examples of the present invention. First, as examples of the first embodiment of the present invention, resin films of Examples 1 to 8 were prepared from resin compositions having compositions shown in Table 1, and each pigment dispersivity and thermal stability was evaluated.

was Ti-Pure R960 manufactured by DuPont, and $TiO_2$-3 was CR-90-2 manufactured by Ishihara Sangyo Kaisha, Ltd. The fatty acid ester of polyethylene glycol (PEG) used was polyoxyethylene bisphenol A laurate (EXCEPARL BP-DL manufactured by Kao Corporation) represented by Chemical Formula 1.

[C. 1]

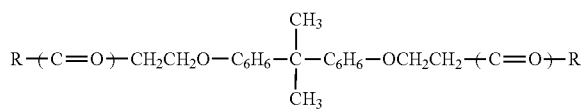

The adhesion amounts of alumina and silica in each titanium oxide shown in Table 1 were determined by the following method. First, elementary analysis was carried out using an X-ray fluorescence (XRF) analyzer Zsx100e manufactured by Rigaku Corporation to specify the elements adhering to the titanium oxide surface. Next, quantitative analysis was

TABLE 1

|  |  |  | Example |  |  |  |  |  |  |  |
|---|---|---|---|---|---|---|---|---|---|---|
|  |  |  | 1 | 2 | 3 | 4 | 5 | 6 | 7 | 8 |
| Resin composition | Vinylidene fluoride resin (% by mass) | PVDF-1 | 80 | — | — | 80 | 40 | 80 | 80 | — |
|  |  | PVDF-2 | — | 80 | 80 | — | 40 | — | — | 80 |
|  | Methacrylic acid ester resin (% by mass) |  | 20 | 20 | 20 | 20 | 20 | 20 | 20 | 20 |
|  | Total amount of resin components (parts by mass) |  | 100 | 100 | 100 | 100 | 100 | 100 | 100 | 100 |
|  | Titanium oxide (parts by mass) | $TiO_2$-1 | 20 | — | — | 20 | — | — | 25 | — |
|  |  | $TiO_2$-2 | — | 15 | — | — | 20 | 12 | — | 10 |
|  |  | $TiO_2$-3 | — | — | 20 | — | — | — | — | — |
|  | Adhesion amount of alumina (% by mass) |  | 3.2 | 3.5 | 4.0 | 3.2 | 3.5 | 3.5 | 3.2 | 4.0 |
|  | Adhesion amount of silica (% by mass) |  | 3.5 | 6.5 | 6.0 | 3.5 | 6.5 | 6.5 | 3.5 | 7.0 |
|  | Total adhesion amount of alumina and silica (% by mass) |  | 6.7 | 10 | 10 | 6.7 | 10 | 10 | 6.7 | 11 |
|  | Fatty acid ester of PEG (parts by mass) |  | 1 | 2 | 4 | 2 | 1 | 1 | 2.5 | 1 |
|  | Film thickness (μm) |  | 20 | 30 | 20 | 30 | 20 | 30 | 20 | 40 |

Specifically, first, a vinylidene fluoride resin, a methacrylic acid ester resin, a titanium oxide, and a fatty acid ester of polyethylene glycol (PEG) were blended in a tumbler at a combination ratio shown in Table 1. Then, the whole was kneaded with a twin screw extruder having a diameter Φ of 45 mm to give a compound (resin composition). Next, the compound was processed with a film forming machine that included a single screw extruder having a diameter Φ of 40 mm equipped with a coat hanger die having a slit of 0.4 mm and a width of 400 mm to prepare a resin film having a thickness shown in Table 1.

In the vinylidene fluoride resins shown in Table 1, PVDF-1 was Kynar K720 manufactured by Arkema Inc., and PVDF-2 was Kynar K740 manufactured by Arkema Inc. The methacrylic acid ester resin used was HIPET HBS000 manufactured by Mitsubishi Rayon Co., Ltd. For the titanium oxide, $TiO_2$-1 was Ti-Pure R105 manufactured by DuPont, $TiO_2$-2 carried out on the surface of the titanium oxide particles with an X-ray photoelectron spectrometer ESCA-5500MC manufactured by PHI to determine each amount of alumina and silica present on the titanium oxide surface. Then, on the basis of these analytical results and the mass ratio of the oxides of elements ($TiO_2$, $Al_2O_3$, and $SiO_2$), the adhesion amounts of alumina and silica in each titanium oxide were calculated.

Meanwhile, for Comparative Examples of the first embodiment of the present invention, resin films of Comparative Examples 1 to 6 were prepared from resin compositions having compositions shown in Table 2 in a similar manner to that in Examples 1 to 8, and each pigment dispersivity and thermal stability was evaluated. Among the titanium oxides shown in Table 2, $TiO_2$-4 was Ti-Pure R104 manufactured by DuPont, $TiO_2$-5 was Ti-Pure R102 manufactured by DuPont, $TiO_2$-6 was Ti-Pure R350 manufactured by DuPont, and $TiO_2$-7 was CR-85 manufactured by Ishihara Sangyo Kaisha, Ltd.

TABLE 2

| | | | Comparative Example | | | | | |
|---|---|---|---|---|---|---|---|---|
| | | | 1 | 2 | 3 | 4 | 5 | 6 |
| Resin composition | Vinylidene fluoride resin (% by mass) | PVDF-1 | 80 | 80 | — | 80 | 80 | 80 |
| | | PVDF-2 | — | — | 80 | — | — | — |
| | Methacrylic acid ester resin (% by mass) | | 20 | 20 | 20 | 20 | 20 | 20 |
| | Total amount of resin components (parts by mass) | | 100 | 100 | 100 | 100 | 100 | 100 |
| | Titanium oxide (parts by mass) | $TiO_2$-2 | — | — | — | — | — | 20 |
| | | $TiO_2$-4 | 20 | — | — | — | — | — |
| | | $TiO_2$-5 | — | 20 | — | — | — | — |
| | | $TiO_2$-6 | — | — | 20 | 7 | — | — |
| | | $TiO_2$-7 | — | — | — | — | 20 | — |
| | Adhesion amount of alumina (% by mass) | | 1.7 | 3.2 | 1.7 | 1.7 | 5.0 | 3.5 |
| | Adhesion amount of silica (% by mass) | | — | — | 3.0 | 3.0 | 7.0 | 6.5 |
| | Total adhesion amount of alumina and silica (% by mass) | | 1.7 | 3.2 | 4.7 | 4.7 | 12 | 10 |
| | Fatty acid ester of PEG (parts by mass) | | 2 | 2 | 2 | 2 | 2 | — |
| | Film thickness (μm) | | 20 | 30 | 20 | 20 | 20 | 30 |

Each resin film of Examples and Comparative Examples was evaluated by the methods shown below.

<Pigment Dispersivity>

Light was applied from the back side of each resin film, and the number of pigment aggregates having an area of 0.05 mm² or more was visually counted in a film area of 0.3 m² using a dirt comparison chart (JIS P8145). As a result, the pigment dispersivity in each film was evaluated as follows: a number of pigment aggregates of less than 10 was "excellent"; a number of pigment aggregates of 10 or more and less than 30 was "good"; and a number of pigment aggregates of 30 or more was "failure".

<Thermal Stability>

Each compound shown in Table 1 and Table 2 was pressed using a hot pressing machine at 230° C. and at a pressure of 5 MPa to prepare a sheet for measurement having a thickness of about 0.3 mm. Next, the sheet for measurement was placed in an oven and heated under a condition A at 265° C. for 30 minutes or under a condition B at 265° C. for 60 minutes. Then, the change in color of the sheet before and after the heat was determined with a colorimeter (COLOR-7X manufactured by Kurabo Industries Ltd.). Color difference ($\Delta E^*ab$) was calculated from Mathematical Formula 1 on the basis of the results. In Equation 1, L* was lightness, and each a* and b* was chromaticity.

$$\Delta E^*ab = \{(\Delta L^*)^2 + (\Delta a^*)^2 + \Delta b^{*2}\}^{1/2} \quad [\text{Eq. 1}]$$

The evaluation was carried out as follows: a color difference ($\Delta E^*ab$) of less than 5 was "excellent"; a color difference ($\Delta E^*ab$) of 5 or more and less than 7 was "good"; and a color difference ($\Delta E^*ab$) of 7 or more was "failure". The obtained results are summarized in Table 3.

TABLE 3

| | Thermal stability | | | Dispersivity | |
|---|---|---|---|---|---|
| | <Condition A> color difference ($\Delta E^*ab$) | <Condition B> color difference ($\Delta E^*ab$) | Evaluation | Number of pigment aggregates | Evaluation |
| Example 1 | 3.2 | 4.9 | Excellent | 12 | Good |
| Example 2 | 3.6 | 5.8 | Good | 8 | Excellent |
| Example 3 | 2.5 | 3.0 | Excellent | 19 | Good |
| Example 4 | 3.2 | 4.9 | Excellent | 7 | Excellent |
| Example 5 | 4.3 | 6.3 | Good | 17 | Good |
| Example 6 | 2.5 | 3.0 | Excellent | 15 | Good |
| Example 7 | 3.9 | 6.0 | Good | 16 | Good |
| Example 8 | 3.0 | 6.0 | Good | 13 | Good |
| Comparative Example 1 | 8.8 | 13 | Failure | 6 | Excellent |
| Comparative Example 2 | 4.4 | 7.9 | Failure | 8 | Excellent |
| Comparative Example 3 | 9.0 | 16 | Failure | 19 | Good |
| Comparative Example 4 | 5.4 | 9.6 | Failure | 12 | Good |
| Comparative Example 5 | 3.0 | 5.2 | Good | 56 | Failure |
| Comparative Example 6 | 3.8 | 6.3 | Good | 41 | Failure |

As shown in Table 3, the resin films of Comparative Examples 1 and 2 that used the titanium oxide coated with alumina alone and the resin films of Comparative Examples 3 and 4 that used the titanium oxide having a total adhesion amount of alumina and silica of less than 5% by mass were poor in the thermal stability. Meanwhile, the resin film of Comparative Example 5 that used the titanium oxide having a total adhesion amount of alumina and silica of more than 11% by mass and the resin film of Comparative Example 6 that included neither a fatty acid ester of polyethylene glycol (PEG) nor its derivative were poor in the dispersivity of the inorganic pigment.

In contrast, the resin films of Examples 1 to 8 prepared within the scope of the invention were excellent in the pigment dispersivity and the thermal stability during the forming process in comparison with the resin films of Comparative Examples 1 to 6. These results ascertained that the vinylidene fluoride resin film of the present invention was unlikely to cause poor dispersion, suppressed the formation of pinholes during the film forming process, and had excellent thermal stability, even when the film included a large amount of the inorganic pigment for coloration.

Second Example

Next, as examples of the second embodiment of the present invention, resin films having a two-layer structure composed of the front side layer and the back side layer (Examples 11 to 18) were prepared from resin compositions having compositions shown in Table 4 and Table 5, and each pigment dispersivity, thermal stability, weatherability, and adhesiveness was evaluated.

TABLE 4

| | | | Example 11 | | Example 12 | | Example 13 | | Example 14 | |
|---|---|---|---|---|---|---|---|---|---|---|
| | | | Front side layer | Back side layer | Front side layer | Back side layer | Front side layer | Back side layer | Front side layer | Back side layer |
| Resin composition | Vinylidene fluoride resin (% by mass) | PVDF-1 | 80 | 20 | — | — | — | — | 80 | — |
| | | PVDF-2 | — | — | 80 | 20 | 80 | 30 | — | 15 |
| | Methacrylic acid ester resin (% by mass) | | 20 | 80 | 20 | 80 | 20 | 70 | 20 | 85 |
| | Total amount of resin components (parts by mass) | | 100 | 100 | 100 | 100 | 100 | 100 | 100 | 100 |
| | Titanium oxide (parts by mass) | $TiO_2$-1 | 20 | 20 | — | — | — | — | 20 | 20 |
| | | $TiO_2$-2 | — | — | 15 | 15 | — | — | — | — |
| | | $TiO_2$-3 | — | — | — | — | 20 | 20 | — | — |
| | Adhesion amount of alumina (% by mass) | | 3.2 | 3.2 | 3.5 | 3.5 | 4.0 | 4.0 | 3.2 | 3.2 |
| | Adhesion amount of silica (% by mass) | | 3.5 | 3.5 | 6.5 | 6.5 | 6.0 | 6.0 | 3.5 | 3.5 |
| | Total adhesion amount of alumina and silica (% by mass) | | 6.7 | 6.7 | 10 | 10 | 10 | 10 | 6.7 | 6.7 |
| | Fatty acid ester of PEG (parts by mass) | | 1 | 1 | 2 | 2 | 4 | 4 | 2 | 2 |
| | Thickness (μm) | | 20 | 10 | 30 | 10 | 20 | 10 | 30 | 15 |

TABLE 5

| | | | Example 15 | | Example 16 | | Example 17 | | Example 18 | |
|---|---|---|---|---|---|---|---|---|---|---|
| | | | Front side layer | Back side layer | Front side layer | Back side layer | Front side layer | Back side layer | Front side layer | Back side layer |
| Resin composition | Vinylidene fluoride resin (% by mass) | PVDF-1 | 40 | — | 80 | 30 | 80 | 20 | — | — |
| | | PVDF-2 | 40 | 40 | — | — | — | — | 80 | 20 |
| | Methacrylic acid ester resin (% by mass) | | 20 | 60 | 20 | 70 | 20 | 80 | 20 | 80 |
| | Total amount of resin components (parts by mass) | | 100 | 100 | 100 | 100 | 100 | 100 | 100 | 100 |
| | Titanium oxide (parts by mass) | $TiO_2$-1 | — | — | — | — | 25 | 25 | — | — |
| | | $TiO_2$-2 | 20 | 20 | 12 | 12 | — | — | 10 | 10 |
| | | $TiO_2$-3 | — | — | — | — | — | — | — | — |
| | Adhesion amount of alumina (% by mass) | | 3.5 | 3.5 | 3.5 | 3.5 | 3.2 | 3.2 | 3.5 | 3.5 |
| | Adhesion amount of silica (% by mass) | | 6.5 | 6.5 | 6.5 | 6.5 | 3.5 | 3.5 | 6.5 | 6.5 |
| | Total adhesion amount of alumina and silica (% by mass) | | 10 | 10 | 10 | 10 | 6.7 | 6.7 | 10 | 10 |
| | Fatty acid ester of PEG (parts by mass) | | 1 | 1 | 1 | 1 | 2.5 | 2.5 | 2 | 2 |
| | Thickness (μm) | | 20 | 10 | 27 | 13 | 30 | 10 | 27 | 13 |

Specifically, a vinylidene fluoride resin, a methacrylic acid ester resin, a titanium oxide, and a fatty acid ester of polyethylene glycol (PEG) were blended in a tumbler at a combination ratio shown in Table 4 and Table 5. Then, the whole was kneaded with a twin screw extruder having a diameter Φ of 45 mm to give each compound (resin composition) for the front side layer and the back side layer. Next, the compound was processed with two single screw extruders each having a diameter Φ of 40 mm and having a merging section at which a T-die film extruder composed of a feed block was placed to prepare a resin film having a thickness shown in Table 4 and Table 5.

In the vinylidene fluoride resins shown in Table 4 and Table 5, PVDF-1 was Kynar K720 manufactured by Arkema Inc., and PVDF-2 was Kynar K740 manufactured by Arkema Inc. The methacrylic acid ester resin used was HIPET HBS000 manufactured by Mitsubishi Rayon Co., Ltd. For the titanium oxide, $TiO_2$-1 was Ti-Pure R105 manufactured by DuPont, $TiO_2$-2 was Ti-Pure R960 manufactured by DuPont, and $TiO_2$-3 was CR-90-2 manufactured by Ishihara Sangyo Kaisha, Ltd.

The fatty acid ester of polyethylene glycol (PEG) used was polyoxyethylene bisphenol A laurate (EXCEPARL BP-DL manufactured by Kao Corporation) represented by Chemical Formula 1. The adhesion amounts of alumina and silica in each titanium oxide shown in Table 4 and Table 5 were determined in a similar manner to that in First Example.

Next, for Comparative Examples of the second embodiment of the present invention, resin films of Comparative Examples 11 to 19 were prepared from resin compositions having compositions shown in Table 6 and Table 7 in a similar manner to that in Examples 11 to 18, and each pigment dispersivity, thermal stability, weatherability, and adhesiveness was evaluated. Among the titanium oxides shown in Table 6 and Table 7, $TiO_2$-4 was Ti-Pure R104 manufactured by DuPont, $TiO_2$-5 was Ti-Pure R102 manufactured by DuPont, $TiO_2$-6 was Ti-Pure R350 manufactured by DuPont, and $TiO_2$-7 was CR-85 manufactured by Ishihara Sangyo Kaisha, Ltd.

TABLE 6

| | | | Comparative Example | | | | | | | | | |
|---|---|---|---|---|---|---|---|---|---|---|---|---|
| | | | 11 | | 12 | | 13 | | 14 | | 15 | |
| | | | Front side layer | Back side layer | Front side layer | Back side layer | Front side layer | Back side layer | Front side layer | Back side layer | Front side layer | Back side layer |
| Resin composition | Vinylidene fluoride resin (% by mass) | PVDF-1 | 80 | 20 | 80 | 20 | — | — | 80 | 20 | 80 | 20 |
| | | PVDF-2 | — | — | — | — | 80 | 20 | — | — | — | — |
| | Methacrylic acid ester resin (% by mass) | | 20 | 80 | 20 | 80 | 20 | 80 | 20 | 80 | 20 | 80 |
| | Total amount of resin components (parts by mass) | | 100 | 100 | 100 | 100 | 100 | 100 | 100 | 100 | 100 | 100 |
| | Titanium oxide (parts by mass) | $TiO_2$-1 | — | — | — | — | — | — | — | — | — | — |
| | | $TiO_2$-2 | — | — | — | — | — | — | — | — | — | — |
| | | $TiO_2$-4 | 20 | 20 | — | — | — | — | — | — | — | — |
| | | $TiO_2$-5 | — | — | 20 | 20 | — | — | — | — | — | — |
| | | $TiO_2$-6 | — | — | — | — | 20 | 20 | 7 | 7 | — | — |
| | | $TiO_2$-7 | — | — | — | — | — | — | — | — | 20 | 20 |
| | Adhesion amount of alumina (% by mass) | | 1.7 | 1.7 | 3.2 | 3.2 | 1.7 | 1.7 | 1.7 | 1.7 | 5.0 | 5.0 |
| | Adhesion amount of silica (% by mass) | | — | — | — | — | 3.0 | 3.0 | 3.0 | 3.0 | 7.0 | 7.0 |
| | Total adhesion amount of alumina and silica- (% by mass) | | 1.7 | 1.7 | 3.2 | 3.2 | 4.7 | 4.7 | 4.7 | 4.7 | 12 | 12 |
| | Fatty acid ester of PEG (parts by mass) | | 2 | 2 | 2 | 2 | 2 | 2 | 2 | 2 | 2 | 2 |
| | Thickness (μm) | | 20 | 10 | 30 | 10 | 20 | 10 | 20 | 10 | 20 | 10 |

TABLE 7

| | | | Comparative Example | | | | | | | |
|---|---|---|---|---|---|---|---|---|---|---|
| | | | 16 | | 17 | | 18 | | 19 | |
| | | | Front side layer | Back side layer | Front side layer | Back side layer | Front side layer | Back side layer | Front side layer | Back side layer |
| Resin composition | Vinylidene fluoride resin (% by mass) | PVDF-1 | 80 | 20 | 60 | 50 | 20 | 80 | 80 | — |
| | | PVDF-2 | — | — | — | — | — | — | — | — |
| | Methacrylic acid ester resin (% by mass) | | 20 | 80 | 40 | 50 | 80 | 20 | 20 | 100 |
| | Total amount of resin components (parts by mass) | | 100 | 100 | 100 | 100 | 100 | 100 | 100 | 100 |
| | Titanium oxide (parts by mass) | $TiO_2$-1 | — | — | 20 | 20 | — | — | — | — |
| | | $TiO_2$-2 | 20 | 20 | — | — | 20 | 20 | — | 20 |
| | | $TiO_2$-4 | — | — | — | — | — | — | — | — |

TABLE 7-continued

|  | Comparative Example | | | | | | | |
|---|---|---|---|---|---|---|---|---|
|  | 16 | | 17 | | 18 | | 19 | |
|  | Front side layer | Back side layer | Front side layer | Back side layer | Front side layer | Back side layer | Front side layer | Back side layer |
| $TiO_2$-5 | — | — | — | — | — | — | — | — |
| $TiO_2$-6 | — | — | — | — | — | — | — | — |
| $TiO_2$-7 | — | — | — | — | — | — | — | — |
| Adhesion amount of alumina (% by mass) | 3.5 | 3.5 | 3.2 | 3.2 | 3.5 | 3.5 | 3.5 | 3.5 |
| Adhesion amount of silica (% by mass) | 6.5 | 6.5 | 3.5 | 3.5 | 6.5 | 6.5 | 6.5 | 6.5 |
| Total adhesion amount of alumina and silica-(parts by mass) | 10 | 10 | 6.7 | 6.7 | 10 | 10 | 10 | 10 |
| Fatty acid ester of PEG (parts by mass) | — | — | 1 | 1 | 1 | 1 | 1 | 1 |
| Thickness (μm) | 27 | 13 | 20 | 10 | 20 | 10 | 20 | 10 |

For the evaluation of each resin film of Examples and Comparative Examples, the "pigment dispersivity" and "thermal stability" were evaluated in a similar manner to that in First Example, and the "weatherability" and "adhesiveness" were evaluated by the methods shown below.

<Weatherability>

Each resin film of Examples and Comparative Example was subjected to weatherability test using an accelerated weathering machine (EYE Super UV Tester W-1 manufactured by Daipla Wintes Co., Ltd). The test conditions were a black panel temperature of 63° C. and an irradiation/condensation cycle of 6 hours/2 hours. The surface glossiness of each film before the test and the surface glossiness after the test for 200 hours were measured with a 60° gloss meter (IG-320 manufactured by Horiba, Ltd.). Then, the gloss retention (%) represented by the ratio (the glossiness after the test/the glossiness before the test) was calculated. A higher value in the gloss retention means better weatherability.

<Adhesiveness>

A polyvinyl chloride (PVC) marking film was used as a base material. Each resin film of Examples and Comparative Examples was heat laminated to the base material, and the adhesiveness was evaluated. Specifically, the surface of each resin film of Examples and Comparative Examples was coated with an acrylic adhesive, and then the base material and the resin film were bonded with a roll laminating machine at a heating temperature of 150° C. The adhesiveness was evaluated by whether the base material and the resin film could be exfoliated by hand. As a result, a film that could not be exfoliated by hand and had good adhesiveness is represented as ○, and a resin film that could be exfoliated from the base material by hand is represented as x.

The obtained results are summarized in Table 8.

TABLE 8

|  | Thermal stability | | | Dispersivity | | Weatherability Gloss retention (%) | Adhesiveness |
|---|---|---|---|---|---|---|---|
|  | <Condition A> color difference (ΔE*ab) | <Condition B> color difference (ΔE*ab) | Evaluation | Number of pigment aggregates | Evaluation | | |
| Example 11 | 3.3 | 5.1 | Good | 10 | Good | 81 | ○ |
| Example 12 | 3.8 | 6.1 | Good | 7 | Excellent | 95 | ○ |
| Example 13 | 2.8 | 3.4 | Excellent | 17 | Good | 93 | ○ |
| Example 14 | 3.3 | 5.1 | Good | 4 | Excellent | 84 | ○ |
| Example 15 | 4.4 | 6.5 | Good | 14 | Good | 91 | ○ |
| Example 16 | 2.8 | 3.3 | Excellent | 12 | Good | 87 | ○ |
| Example 17 | 3.7 | 5.8 | Good | 14 | Good | 86 | ○ |
| Example 18 | 3.2 | 5.7 | Good | 12 | Good | 92 | ○ |
| Comparative Example 11 | 8.8 | 13 | Failure | 4 | Excellent | 16 | ○ |
| Comparative Example 12 | 4.4 | 7.9 | Failure | 7 | Excellent | 18 | ○ |
| Comparative Example 13 | 9.0 | 16 | Failure | 16 | Good | 81 | ○ |
| Comparative Example 14 | 5.4 | 9.6 | Failure | 8 | Excellent | 34 | ○ |
| Comparative Example 15 | 3.0 | 5.2 | Good | 50 | Failure | 94 | ○ |
| Comparative Example 16 | 3.8 | 6.3 | Good | 37 | Failure | 86 | ○ |
| Comparative Example 17 | 3.5 | 5.8 | Good | 9 | Excellent | 54 | x |

TABLE 8-continued

|  | Thermal stability | | | Dispersivity | | Weatherability Gloss retention (%) | Adhesiveness |
|---|---|---|---|---|---|---|---|
|  | <Condition A> color difference (ΔE*ab) | <Condition B> color difference (ΔE*ab) | Evaluation | Number of pigment aggregates | Evaluation | | |
| Comparative Example 18 | 4.0 | 6.1 | Good | 12 | Good | 32 | x |
| Comparative Example 19 | 3.9 | 6.1 | Good | 5 | Excellent | 14 | ○ |

As shown in Table 8, the resin films of Comparative Examples 11 and 12 that used the titanium oxide coated with alumina alone were poor in the thermal stability. Furthermore, the resin films of Comparative Examples 11 and 12 also had small gloss retention and showed remarkable degradation of the film surface. The resin films of Comparative Examples 13 and 14 that used the titanium oxide having a total adhesion amount of alumina and silica of less than 5% by mass were poor in the thermal stability, and in the resin film of Comparative Example 14, the degradation of the film surface was developed.

Meanwhile, the resin film of Comparative Example 15 that used the titanium oxide having a total adhesion amount of alumina and silica of more than 11% by mass and the resin film of Comparative Example 16 that included neither a fatty acid ester of polyethylene glycol (PEG) nor its derivative were poor in the dispersivity of the inorganic pigment. The resin films of Comparative Examples 17 and 18 that included a small amount of the vinylidene fluoride resin in the front side layer and included a small amount of the methacrylic acid ester resin in the back side layer were poor in the light fastness and the adhesiveness. The resin film of Comparative Example 19 that included no titanium oxide in the front side layer and included no vinylidene fluoride resin in the back side layer had excellent adhesiveness but significantly poor weatherability.

In contrast, the resin films of Examples 11 to 18 that were prepared within the scope of the invention had excellent pigment dispersivity and thermal stability during the forming process in comparison with the resin films of Comparative Examples 11 to 19, and also had high gloss retention of 80% or more, and the surface degradation was suppressed. These results ascertained that the vinylidene fluoride resin film of the present invention was unlikely to cause poor dispersion, suppressed the formation of pinholes during the film forming process, and had excellent thermal stability and weatherability, even when the film included a large amount of the inorganic pigment for coloration.

INDUSTRIAL APPLICABILITY

The vinylidene fluoride resin film of the present invention has chemical resistance, weatherability, and stain resistance, exhibits high adhesiveness to other base materials, especially has an excellent lusterless low gloss surface and has excellent mechanical strength and thermal workability. Therefore, it is suitable for various applications such as interior and exterior materials of buildings and members for automobiles, especially decoration and design improvement of applications requiring high weatherability, such as wallpapers, interior and exterior materials for vehicles and interior and exterior materials for elevator and the like as well as roof materials, wall materials, rain gutters, garages, arcades, sunrooms, agricultural materials, canvas for tents, advertising displays, signs, labels, marking films, furniture, home electric appliances, trays, roof tiles, solar cells, and window glass.

The invention claimed is:

1. A vinylidene fluoride resin film comprising:
   a vinylidene fluoride resin;
   a methacrylic acid ester resin;
   a titanium oxide surface treated with alumina and silica; and
   a fatty acid ester of polyethylene glycol and/or a derivative thereof;
   the titanium oxide having a total adhesion amount of alumina and silica of 5 to 11% by mass and having a particle diameter of 0.05 to 2.0 µm in terms of average particle diameter, inclusive of adhered silica and alumina, determined by precipitation, and
   wherein a color difference $\Delta E^*ab$ of the resin film heated under a condition of 265° C. for 30 minutes is 2.5 to 4.3, and a color difference $\Delta E^*ab$ of the resin film heated under a condition of 265° C. for 60 minutes is 3.3 to 6.5.

2. The vinylidene fluoride resin film according to claim 1, wherein a content of the titanium oxide is 10 to 25 parts by mass, and a total content of the fatty acid ester of polyethylene glycol and/or the derivative thereof is 0.1 to 5 parts by mass, relative to 100 parts by mass of a resin component composed of 70 to 95% by mass of the vinylidene fluoride resin and 5 to 30% by mass of the methacrylic acid ester resin.

3. The vinylidene fluoride resin film according to claim 2, wherein the content of the titanium oxide is 12 to 20 parts by mass.

4. The vinylidene fluoride resin film according to claim 1, wherein the total adhesion amount of alumina and silica is 6 to 10% by mass in the titanium oxide.

5. The vinylidene fluoride resin film according to claim 1, wherein the adhesion amount of alumina is 2.5% by mass or more and the adhesion amount of silica is 2.5% by mass or more in the titanium oxide.

6. The vinylidene fluoride resin film according to claim 1, wherein the thickness of the film is 10 to 100 µm.

7. The vinylidene fluoride resin film according to claim 1, wherein the particles of titanium dioxide are first coated with a first layer of silica and a second layer of alumina.

8. The vinylidene fluoride resin film according to claim 1, wherein the particles of titanium dioxide are first coated with a layer of silica and then coated with a single layer that contains both alumina and silica.

9. A vinylidene fluoride resin film comprising a multilayer film including two or more layers having compositions different from each other,
   at least a front side layer and a back side layer including a vinylidene fluoride resin, a methacrylic acid ester resin, a titanium oxide surface treated with alumina and silica, and a fatty acid ester of polyethylene glycol and/or a derivative thereof, the front side layer having a combination ratio of the vinylidene fluoride resin and the methacrylic acid ester resin of 70:30 to 95:5 in terms of mass ratio, the back side layer having a combination ratio of the vinylidene fluoride resin and the methacrylic acid ester resin of 5:95 to 45:55 in terms of mass ratio, and the titanium oxide having a total adhesion amount of alumina and silica of 5 to 11% by mass and having a particle diameter of 0.05 to 2.0 μm in terms of average particle diameter, inclusive of adhered silica and alumina, determined by precipitation, and wherein a color difference $\Delta E^*ab$ of the resin film heated under a condition of 265° C. for 30 minutes is 2.5 to 4.3, and a color difference $\Delta E^*ab$ of the resin film heated under a condition of 265° C. for 60 minutes is 3.3 to 6.5.

10. The vinylidene fluoride resin film according to claim 9, wherein the front side layer and/or the back side layer include the titanium oxide at a content of 10 to 25 parts by mass and the fatty acid ester of polyethylene glycol and/or the derivative thereof at a total content of 0.1 to 5 parts by mass, relative to 100 parts by mass of a resin component composed of the vinylidene fluoride resin and the methacrylic acid ester resin.

11. The vinylidene fluoride resin film according to claim 10, wherein the content of the titanium oxide is 12 to 20 parts by mass.

12. The vinylidene fluoride resin film according to claim 9, wherein the total adhesion amount of alumina and silica is 6 to 10% by mass in the titanium oxide.

13. The vinylidene fluoride resin film according to claim 9, wherein the adhesion amount of alumina is 2.5% by mass or more and the adhesion amount of silica is 2.5% by mass or more in the titanium oxide.

14. The vinylidene fluoride resin film according to claim 9, wherein the thickness of the film is 10 to 100 μm.

* * * * *